(12) United States Patent
Shinohara et al.

(10) Patent No.: US 8,985,987 B2
(45) Date of Patent: Mar. 24, 2015

(54) APPARATUS FOR PRODUCING THERMOPLASTIC RESIN PELLETS

(75) Inventors: Katsumi Shinohara, Niigata (JP); Tomomichi Kanda, Niigata (JP); Hideyuki Kurose, Niigata (JP); Minoru Kikuchi, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 524 days.

(21) Appl. No.: 13/450,845

(22) Filed: Apr. 19, 2012

(65) Prior Publication Data

US 2012/0201917 A1  Aug. 9, 2012

Related U.S. Application Data

(62) Division of application No. 12/474,365, filed on May 29, 2009, now Pat. No. 8,246,875.

(30) Foreign Application Priority Data

May 30, 2008 (JP) ................. 2008-142734

(51) Int. Cl.
*B29B 9/06* (2006.01)
*B29K 77/00* (2006.01)

(52) U.S. Cl.
CPC ............... *B29B 9/06* (2013.01); *B29K 2077/00* (2013.01)
USPC ............................ 425/135; 425/308; 264/141

(58) Field of Classification Search
CPC .............................. B29B 9/06; B29C 47/0066
USPC ................................... 425/135, 308; 264/141
See application file for complete search history.

(56) References Cited

U.S. PATENT DOCUMENTS

2006/0284333 A1  12/2006  Asahara et al.
2009/0295016 A1  12/2009  Shinohara et al.

FOREIGN PATENT DOCUMENTS

| CN | 1852797 A | 10/2006 |
|---|---|---|
| EP | 0 477 743 A2 | 4/1992 |
| JP | 4-25408 A | 1/1992 |

(Continued)

OTHER PUBLICATIONS

Extended European Search Report issued Dec. 17, 2012, in European Patent Application No. 09161353.9.

(Continued)

*Primary Examiner* — James Sanders
(74) *Attorney, Agent, or Firm* — Oblon, McClelland, Maier & Neustadt, L.L.P.

(57) ABSTRACT

The present invention provides an apparatus for producing thermoplastic resin pellets of uniform shape. The apparatus includes a batch-type polymerization vessel whose inner pressure can be controlled; a pelletizer for cutting a strand-form thermoplastic resin discharged from the polymerization vessel, thereby forming pellets; a pipe for transferring the pellets to a storage container by pneumatic transportation or suction transportation; a pressure differential measuring unit for determining variation in a pressure difference between the inlet and the outlet of the transfer pipe; and a pressure controlling unit for controlling the inner pressure of the batch-type polymerization vessel on the basis of the variation in the measured pressure difference; wherein the inner pressure of the batch-type polymerization vessel is controlled in relation to a pressure loss in the transfer pipe.

2 Claims, 2 Drawing Sheets

(56) References Cited

FOREIGN PATENT DOCUMENTS

| | | |
|---|---|---|
| JP | 8-164519 A | 6/1996 |
| JP | 11-254431 A | 9/1999 |
| JP | 2001-315119 A | 11/2001 |
| JP | 2001-334527 A | 12/2001 |
| JP | 2002-161109 A | 6/2002 |
| JP | 2005-224982 A | 8/2005 |

OTHER PUBLICATIONS

Combined Chinese Office Action and Search Report issued Jan. 25, 2013, Chinese Patent Application No. 200910142307.4.

APPARATUS FOR PRODUCING THERMOPLASTIC RESIN PELLETS

CROSS REFERENCE TO RELATED APPLICATIONS

This application is a divisional application of prior U.S. application Ser. No. 12/474,365, filed May 29, 2009, the disclosure of which is incorporated herein by reference in its entirety. The parent application claims priority to Japanese Application No. 2008-142734, filed May 30, 2008, the disclosure of which is incorporated herein by reference in its entirety.

BACKGROUND OF THE INVENTION

1. Field of the Invention

The present invention relates to a process for producing thermoplastic resin pellets, and to an apparatus for producing the pellets. More particularly, the present invention relates to a process for producing thermoplastic resin pellets, which provides pellets of uniform shape, which prevents or reduces generation of industrial waste (e.g., pellets of irregular shape, crushed pieces, powder, or long, miscut strands), and which reduces breakage of a pelletization apparatus (e.g., a molten strand cutter); and to an apparatus for producing the thermoplastic resin pellets.

2. Background Art

When a molten polymer is formed into pellets; for example, when a molten polymer (e.g., polyamide or polyester) is discharged from a polymerization vessel for pelletization, there is widely used a polymer pelletization apparatus in which such a molten polymer is extruded in the form of strands through holes having a specific form (such a hole is called a "die hole" or "nozzle"), followed by solidification, and the polymer strand is cut into pellets by means of a cutter.

Thermoplastic resins to which the aforementioned pelletization method can be applied include polyolefin, polystyrene, polyester, polycarbonate, and polyamide. Particularly, the pelletization method is useful for polymer materials obtained through polycondensation reaction (e.g., polyester and polyamide).

Since polyamide exhibits excellent chemical and mechanical properties (e.g., high strength, wear resistance, fatigue resistance, good stainability, and gas barrier property), it can be used as an injection molding material for, for example, home electric appliances, automotive parts, and computer housings; as a clothing material (e.g., fiber yarn or knitted fabric); as a filament material for industrial or leisure use (e.g., tire cord, fishing net, or fishing line); or as a material for food packaging films, container sheets, or bottles. Particularly, polyamide MXD6 (i.e., polyamide having repeating units including an amide bond formed between an aliphatic dicarboxylic acid, and xylylenediamine or bis(aminomethyl) cyclohexane) exhibits high strength, high elastic modulus, low water absorption, and excellent gas barrier property, as compared with, for example, polyamide 6 or polyamide 66. Therefore, polyamide MXD6 is particularly useful as an industrial material or as a material for food packaging films or sheets or bottles.

Generally, when a molten polymer is discharged from a polymerization vessel, in the case of a batch-type method, the interior of the polymerization vessel is pressurized with an inert gas (e.g., nitrogen gas), whereas in the case of a continuous polymerization method, a gear pump, a screw, or a similar apparatus is used. When pelletization is carried out through such a method, the amount of the molten polymer supplied to a pelletization apparatus is varied with, for example, change over time in viscosity of the polymer in the polymerization vessel or change in extrusion pressure, which causes insufficient cooling due to adhesion between polymer strands.

When pelletization is carried out under such conditions, non-discrete pellets or blocking pellets may be generated. The presence of such irregular-shape pellets causes a problem in that normal pneumatic transportation of the pellets fails to be performed, or the pellets cannot be discharged from a stock silo due to formation of a bridge. When such irregular-shape pellets (i.e., pellets having considerably different shapes or sizes) are used, for example, the user cannot consistently supply the pellets to a molding machine, which is problematic.

In order to solve such problems, generally, there has been employed a method in which pellets of irregular shape are separated and removed from discharged pellets by means of a vibration sieve. However, this method necessarily leads to reduction in yield. Particularly, polyamide (in particular, polyamide MXD6, which is a polymer of high elastic modulus) is relatively likely to be affected by change in conditions of a pelletization process, since strands of the polymer exhibit high hardness.

In some cases, disturbance of flow of molten strands may cause inconsistency in size of the strands or instability in cooling/solidification state, resulting in progress of wear of, for example, a cutter, and an increase in frequency of maintenance. Particularly, a polymer of high elastic modulus (e.g., polyamide MXD6) tends to promote wear of a pelletization apparatus, since strands of the polymer exhibit high elastic modulus. Progress of wear of a pelletization apparatus causes difficulty in cutting of polymer strands, resulting in generation of, for example, crushed pieces or powder. In addition, non-cutting of polymer strands (i.e., formation of long strands) causes stoppage of a pelletization process due to clogging of a pelletization apparatus or overload to the apparatus; i.e., reduction in yield of a final product.

Such irregular-shape pellets, crushed pieces, powder, or long, miscut strands are disposed of as industrial waste, and thus cost for disposal or transportation of the waste is further increased, which results in low profit. In recent years, from the viewpoint of growing concern for the environment, demand has arisen for prevention of disposal of waste. Meanwhile, from the viewpoint of an increase in yield, keen demand has arisen for development of a method for preventing or suppressing generation of such industrial waste.

In view of the foregoing, there has been proposed a method for increasing the yield of a final product to a maximum possible extent, in which the state of strands or the shape of pellets is constantly monitored by an operator, and, when any abnormality is observed, discharge of a polymer is stopped, or a receiver for pellets is changed. However, such a manual method poses problems in that a long period of time is required to deal with such abnormality, large amounts of defective pellets are generated, and labor savings (e.g., automated pelletization) fail to be attained.

In order to solve such problems, JP 04-25408A proposes a method employing an apparatus for automatically determining data on the shape of pellets, and an apparatus for regulating cutting speed on the basis of the thus-determined data. However, in this method, cutting speed is regulated only in the flow direction (machine direction) of strands, and thus difficulty is encountered in satisfying the pellet size requirements of users. In addition, this method poses problems in that a response to rapid change in extrusion pressure is delayed;

pellets of non-uniform shape are formed; and pellets of irregular shape are necessarily contained in a final product.

Also, JP 08-164519A proposes a method in which cutting speed is regulated on the basis of the molten polymer viscosity and pressure as determined upon discharge of the polymer, to thereby form pellets of uniform shape. However, this method requires determination of pressure and melt viscosity with high accuracy, and thus requires a complicated structure and high cost. In addition, in this method, take-off speed changes in accordance with change in pressure or viscosity of a molten polymer discharged, and thus difficulty is encountered in reducing or suppressing generation of pellets of irregular shape in the case where strands of a material employed show considerable change in hardness in accordance with change in cooling conditions for the strands.

In the case of a continuous polymerization method, generally, a gear pump, a screw, or a similar apparatus is used so as to discharge a molten polymer at a constant rate in a pelletization process. However, employment of such an apparatus is not desired in the case of a batch-type method, since high equipment investment is required. In addition, unwanted retention part of a molten resin may occur, and thus the retained resin may be deteriorated when a long interval is provided between batch processes or a long period of time is required for a batch polymerization process. JP 11-254431A proposes a method in which the opening degree of a valve for discharging a polymer is regulated on the basis of the determined weight of produced pellets, so that the polymer is discharged at a constant rate, and pellets of uniform shape are produced. However, in this method, change in weight of produced pellets is detected after separation of a cooling medium (e.g., water) from the pellets, and thus difficulty is encountered in rapidly responding to change in amount of a polymer discharged. In addition, in the method for regulating the opening degree of a discharge valve on the basis of change in weight of produced pellets, change in flow of polymer strands may occur directly, and thus difficulty is encountered in reducing or suppressing generation of pellets of irregular shape.

SUMMARY OF THE INVENTION

In order to solve the aforementioned problems, an object of the present invention is to provide a process for producing thermoplastic resin pellets, which realizes production of pellets of uniform shape. Another object of the present invention is to provide an apparatus for producing the thermoplastic resin pellets.

The present inventors have conducted extensive studies for solving the aforementioned problems, and as a result have accomplished the present invention. Accordingly, the present invention is directed to a process for producing thermoplastic resin pellets, comprising pressurizing the interior of a vessel holding a molten thermoplastic resin, thereby discharging the resin; forming pellets through solidification and cutting of the resin; and transferring the pellets to a storage container via a pipe by a pneumatic transportation or a suction transportation, wherein the amount of the resin discharged is regulated by controlling the pressure in the vessel so that variation in the difference pressure between the inlet and the outlet of the pipe for transferring the pellets is 10% or less.

The present invention is also directed to an apparatus for producing thermoplastic resin pellets, comprising a batch-type polymerization vessel whose inner pressure can be controlled; a pelletizer for cutting a strand-form resin discharged from the polymerization vessel, thereby forming pellets; a pipe for transferring the pellets to a storage container by a pneumatic transportation or a suction transportation; means for determining variation in the difference pressure between the inlet and the outlet of the pipe; and means for controlling the inner pressure of the batch-type polymerization vessel on the basis of the thus-determined variation in pressure difference, wherein the inner pressure of the batch-type polymerization vessel is controlled on the basis of pressure loss in the transfer pipe.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

Figure 1:
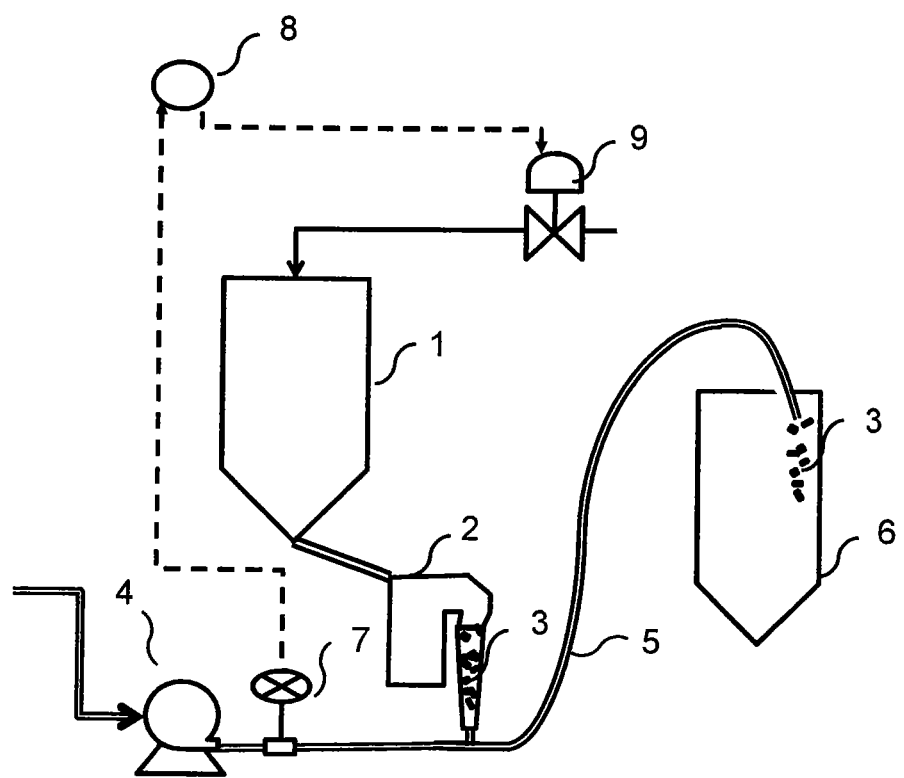
FIG. 1 shows an illustrative view of a production apparatus according to an embodiment of the present invention, wherein pellets are transferred by a pneumatic transportation.

Examples of the thermoplastic resin to which the process for producing pellets of the present invention can be applied include polyolefin, polystyrene, polyester, polycarbonate, and polyamide. Particularly, the process of the present invention is useful for polymer materials obtained through polycondensation reaction (e.g., polyester and polyamide), from the viewpoint of the size of strands with respect to a resin whose physical properties change over time during pelletization, or stabilization of cooling/solidification conditions. The thermoplastic resin is particularly preferably polyamide. Particularly, the process of the present invention is useful for a polyamide in which xylylenediamine and/or bis(aminomethyl)cyclohexane accounts for 70 mol % or more of diamine components serving as raw materials.

In the process for producing pellets of the present invention, the interior of a vessel holding a molten thermoplastic resin is pressurized with, for example, an inert gas and/or steam, to thereby discharge the resin from the bottom of the vessel, followed by solidification and cutting, and the thus-formed pellets are transferred. The pressure for pressurization is appropriately determined on the basis of the rate of discharge of the resin, and, as described hereinbelow, the pressure is controlled on the basis of change in transfer-pressure of resin pellets. The pressure, which may vary with, for example, the type or properties of a resin discharged, or the structure or size of a polymerization vessel, is generally 0.2 MPaG to 0.8 MPaG. When the melt viscosity of a resin discharged is excessively low, strands fail to be formed, whereas when the melt viscosity is excessively high, a very high pressure is required for pelletization, which is impractical. Therefore, the melt viscosity of the resin is preferably 60 Pa·s to 500 Pa·s, more preferably 100 Pa·s to 400 Pa·s. In addition, preferably, the following relations (1) and (2) are satisfied:

$$30 < A \times B < 500 \quad (1)$$

$$0.2 < C < 0.8 \quad (2); \text{ and}$$

more preferably, the following relations (3) and (4) are satisfied:

$$200 < A \times B < 400 \quad (3)$$

$$0.3 < C < 0.6 \quad (4)$$

(wherein A represents the rate of discharge of a thermoplastic resin through one die hole provided at the lower portion of a vessel holding the thermoplastic resin (kg/min); B represents the melt viscosity of the thermoplastic resin (Pa·s); and C represents the ratio of the cross-section major axis length of thermoplastic resin pellets to the diameter of the die hole).

When the value of A×B shown in the aforementioned relation (1) exceeds 30, back pressure is readily controlled, whereas when the value of A×B is less than 500, back pressure during pelletization is maintained at an appropriate level, and effective pelletization is carried out. When the value of C shown in the aforementioned relation (2) exceeds 0.2, back pressure is readily controlled, whereas when the value of C is less than 0.8, back pressure during pelletization is maintained at an appropriate level, and effective pelletization is carried out. In addition, even in the case where back pressure is regulated by take-off speed, when the values of A×B and C fall within the above ranges, take-off speed is not required to be considerably changed.

In the production process of the present invention, the vessel employed for holding a thermoplastic resin is preferably a polymerization vessel of a batch-type polymerization reaction apparatus. In the production process of the present invention, preferably, a molten thermoplastic resin produced in the polymerization vessel is employed, from the viewpoint of simplification of a pelletization process.

Preferably, the thermoplastic resin is discharged in the form of strands and cooled, and then the polymer strands are cut into pellets by means of a pelletizer. Cooling of the strands may be carried out by a water-cooling or air-cooling system. During production of pellets, variation in rotation speed of a cutter or take-off speed is preferably 5% or less, more preferably 3% or less, from the viewpoint of consistency in length of the strands in the flow direction. In order to prevent clogging of a transfer pipe, preferably, an apparatus for removing long, miscut strands before transfer of pellets to a storage container is provided subsequent to the pelletizer. When cooling is carried out by means of a water-cooling system, pellets may be dried by means of a drier before being transferred to a storage container.

Preferably, pellets formed through cutting are transferred, via a transfer pipe having at least one pressure sensor, to a storage container by a pneumatic transportation or a suction transportation. The gas employed for transportation may be air or an inert gas (e.g., nitrogen gas). During transfer of pellets, the transfer pressure in the pipe is constantly or intermittently monitored by means of the pressure sensor, and the back pressure (the aforementioned pressure for pressurization) at the upper portion of the polymerization vessel is controlled so that variation in the difference pressure between the inlet and the outlet of the pipe (hereinafter the pressure difference may be referred to as "pressure loss") is 10% or less, preferably 8% or less, more preferably 6% or less, much more preferably 5% or less. The back pressure may be manually controlled by an operator. However, more preferably, the back pressure is continuously controlled by means of a controller.

When, as described above, the back pressure at the upper portion of the polymerization vessel is controlled so that pressure loss in the transfer pipe falls within a predetermined range during transfer of pellets, the stable discharged amount of the thermoplastic resin is secured, and thus strands of uniform size can be formed. Therefore, pellets of uniform shape can be produced without changing the rotation speed of a cutter or take-off speed.

In the present invention, preferably, produced thermoplastic resin pellets are in the form of a cylinder having a cut cross section (i.e., a cross section perpendicular to the flow direction of strands) which assumes an elliptical shape. Preferably, the ratio of the major axis length of the cross section (hereinafter the length may be referred to as "pellet cross-section major axis length") to the length of pellets as measured in the flow direction of strands (hereinafter the length may be referred to as "pellet length"); i.e., pellet cross-section major axis length/pellet length is 0.7 to 1.3, and pellet length is 2.0 to 4.0 mm. More preferably, the ratio (pellet cross-section major axis length/pellet length) is 0.8 to 1.2, and pellet length is 2.5 to 3.5 mm. In pellets produced through a single batch process, variation in size preferably falls within a range of ±10%, more preferably ±8% with respect to the average size.

The present invention is also directed to an apparatus for producing thermoplastic resin pellets, comprising a batch-type polymerization vessel whose inner pressure can be controlled; a pelletizer for cutting a strand-form thermoplastic resin discharged from the polymerization vessel, thereby forming pellets; a pipe for transferring the pellets to a storage container by a pneumatic transportation or a suction transportation; means for determining the difference in pressure between the inlet and the outlet of the pipe; and means for controlling the inner pressure of the batch-type polymerization vessel on the basis of the thus-determined pressure difference, wherein the inner pressure of the batch-type polymerization vessel is controlled on the basis of pressure loss in the transfer pipe.

FIG. 1 shows an illustrative view of a production apparatus according to an embodiment of the present invention, wherein pellets are transferred by a pneumatic transportation.

Figure 2:
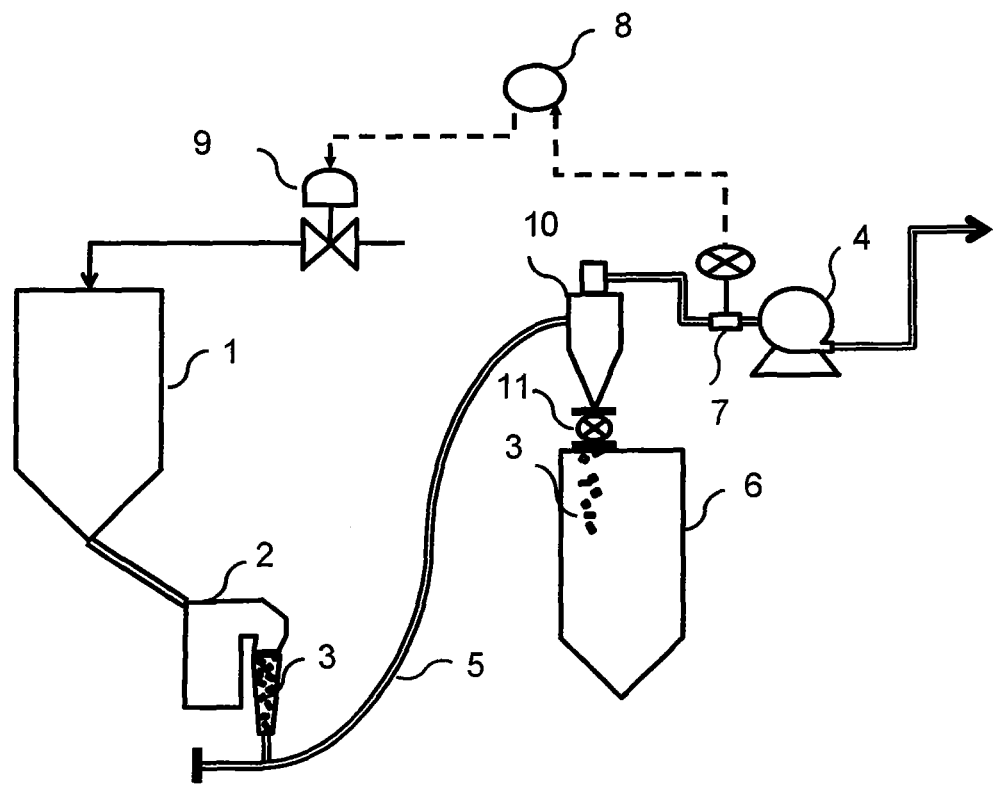
FIG. 2 shows an illustrative view of a production apparatus according to another embodiment of the present invention, wherein pellets are transferred by a suction transportation.

FIG. 2 shows an illustrative view of a production apparatus according to another embodiment of the present invention, wherein pellets are transferred by a suction transportation.

As shown in FIG. 1, a molten resin pressurized in a vessel 1 holding the resin is cut into pellets by means of a resin cutting apparatus 2. Pellets 3 are transferred to a storage container 6 via a pipe 5 by means of pressure of a gaseous fluid supplied from a blower 4. In this case, when the amount of the resin supplied to the pipe 5 increases, pressure loss in the pipe 5 increases, and the pressure value as determined at a pressure sensing terminal 7 becomes higher than a normal level. The pressure data are sent to a pressure regulator 8. On the basis of arithmetic processing of the pressure data in the pressure regulator 8, the setting value of a pressure regulating valve 9 is reduced so that the pressure at the pressure sensing terminal 7 is lowered to the normal value, whereby the back pressure to the resin decreases, and a predetermined amount of the resin is supplied to the pipe 5.

In contrast, when the amount of the resin supplied to the pipe 5 decreases, pressure loss in the pipe 5 decreases, and the pressure value as determined at the pressure sensing terminal 7 becomes lower than a normal level. The pressure data are sent to the pressure regulator 8. On the basis of arithmetic processing of the pressure data in the pressure regulator 8, the setting value of the pressure regulating valve 9 is increased so that the pressure at the pressure sensing terminal 7 is increased to the normal value, whereby the back pressure to the resin increases, and a predetermined amount of the resin is supplied to the pipe 5.

Similar to the case of the production apparatus of FIG. 1, as shown in FIG. 2, a molten resin pressurized in a vessel 1 holding the resin is cut into pellets by means of a resin cutting apparatus 2. Pellets 3 are transferred to a storage container 6 via a pipe 5 through reduced-pressure suction by means of a blower 4. In this case, when the amount of the resin supplied to the pipe 5 increases, pressure loss in the pipe 5 increases, and the pressure as determined at a pressure sensing terminal 7 becomes lower than a normal level. The pressure data are sent to a pressure regulator 8. On the basis of arithmetic processing of the pressure data in the pressure regulator 8, the setting value of a pressure regulating valve 9 is reduced so that the pressure at the pressure sensing terminal 7 is increased to the normal value, whereby the back pressure to the resin decreases, and a predetermined amount of the resin is supplied to the pipe 5.

In contrast, when the amount of the resin supplied to the pipe 5 decreases, pressure loss in the pipe 5 decreases, and the pressure as determined at the pressure sensing terminal 7 becomes higher than a normal level. The pressure data are sent to the pressure regulator 8. On the basis of arithmetic processing of the pressure data in the pressure regulator 8, the setting value of the pressure regulating valve 9 is increased so that the pressure at the pressure sensing terminal 7 is lowered to the normal value, whereby the back pressure to the resin increases, and a predetermined amount of the resin is supplied to the pipe 5.

The process or apparatus for producing thermoplastic resin pellets of the present invention provides the following effects.

(i) Pellets of uniform shape can be produced without employing an expensive device or a device having a complicated structure.

(ii) A pelletization process is stabilized by discharging a resin at a constant rate, and generation of industrial waste (e.g., pellets of irregular shape, crushed pieces, powder, or long, miscut strands) can be prevented or suppressed.

(iii) Clogging of a pipe during pneumatic transportation of pellets can be prevented or suppressed.

The process for producing thermoplastic resin pellets of the present invention is suitable for use in the production of pellets of uniform shape.

EXAMPLES

The present invention will next be described in detail by way of examples, which should not be construed as limiting the invention thereto.

Measurement of Melt Viscosity

Melt viscosity was measured by means of Capillograph D-1 (product of Toyo Seiki Seisaku-Sho, Ltd.) under the following conditions (die: 1 mm$\phi$×10 mm length, apparent shear rate: 100/s, measurement temperature: 260° C., sample water content: 1,000 ppm or less).

Example 1

M-xylylenediamine and adipic acid were subjected to melt polycondensation, to thereby yield a polyamide having a melt viscosity of 180 Pa·s. The polyamide was extruded in the form of molten strands by application of a pressure of 0.5 MPaG under the following conditions: A×B=240 and C=0.4, which satisfy the aforementioned relations (1) and (2) (wherein A represents the rate of discharge of a thermoplastic resin through one die hole provided at the bottom of a polymerization vessel (kg/min); B represents the melt viscosity of the thermoplastic resin (Pa·s); and C represents the ratio of the cross-section major axis length of thermoplastic resin pellets to the diameter of the die hole). The thus-obtained strands were cooled with water and then cut into pellets by means of a cutter.

After removal of long, miscut strands by means of a long strand remover, the pellets were transferred to a storage container through reduced-pressure suction by means of a blower shown in FIG. 2 (wind speed: 28 m/s). Discharge of strands was carried out while the back pressure of the polymerization vessel was continuously regulated with nitrogen gas by means of a controller so that the pressure loss upon transfer of pellets fell within a range of 17.3 to 18.3 kPa (corresponding to a variation of 5.6%). In this case, variation in rotation speed of the cutter was found to be fall within a range of ±1.3% with respect to the average rotation speed, and variation in take-off speed was found to be 2.6%. The rate of discharge of the thermoplastic resin through one die hole provided at the bottom of the polymerization vessel, which is represented by A of the relation (1), was determined by use of the following formula: the discharge rate=the amount of the resin contained in the polymerization vessel (kg)/discharge time (min)/the number of die holes.

During the pelletization process, sampling was continuously carried out at the inlet of the storage container, and pellet length and the ratio of pellet cross-section major axis length to pellet length were determined by means of a vernier caliper. As a result, the average of the ratio (pellet cross-section major axis length/pellet length) was found to be 1.02 (corresponding to a variation of ±7.2% with respect to average value), and the average pellet length was found to be 3.25 mm (corresponding to a variation of ±3.0% with respect to average value). The percent incorporation of pellets of irregular shape (i.e., multi-connected pellets, pellets of long strand shape, or like pellets) was found to be 0.4% or less; i.e., there were produced pellets which vary slightly in shape and contain a small amount of pellets of irregular shape. The aforementioned average values were determined on the basis of data on 30 pellets (the same shall apply hereinafter).

Example 2

In a manner similar to that of Example 1, the polyamide was extruded in the form of molten strands under application of pressure, and the thus-obtained strands were cooled with water and then cut into pellets by means of a cutter.

After removal of long, miscut strands by means of a long strand remover, the pellets were transferred to a storage container through reduced-pressure suction by means of a blower (wind speed: 25 m/s). Discharge of strands was carried out while the back pressure of the polymerization vessel was continuously regulated with nitrogen gas by means of a controller so that the pressure loss upon transfer of pellets fell within a range of 24 to 26 kPa (corresponding to a variation of 8.0%). Similar to the case of Example 1, variation in rotation speed of the cutter was found to be fall within a range of ±1.5% with respect to the average rotation speed, and variation in take-off speed was found to be 3.0%.

During the pelletization process, sampling was continuously carried out at the inlet of the storage container, and pellet length and the ratio of pellet cross-section major axis length to pellet length were determined in a manner similar to that of Example 1. As a result, the average of the ratio (pellet cross-section major axis length/pellet length) was found to be 1.12 (corresponding to a variation of ±9.5% with respect to average value), and the average pellet length was found to be 3.01 mm (corresponding to a variation of ±3.3% with respect to average value). The percent incorporation of pellets of irregular shape was found to be 0.5% or less; i.e., there were produced pellets which vary slightly in shape and contain a small amount of pellets of irregular shape.

Comparative Example 1

The polyamide was extruded under application of a pressure in the same manner as in Example 1, except that the pressure was determined so as to attain the condition: A×B=240, which satisfies the aforementioned relation (1), and that strands were discharged while the thus-determined pressure was maintained. The thus-obtained strands were cooled with water and then cut into pellets by means of a cutter. For regulation of the size of pellets, the shape of pellets was observed and the rotation speed of the cutter was regulated by an operator every time the polyamide was discharged from the reaction vessel in an amount of 1/10 of the entire amount of the polyamide contained in the vessel. After removal of long, miscut strands, the thus-produced pellets were transferred through reduced-pressure suction (wind speed: 25 m/s).

In a manner similar to that of Example 1, sampling was carried out, and pellet length and the ratio of pellet cross-section major axis length to pellet length were determined. As a result, the average of the ratio (pellet cross-section major axis length/pellet length) was found to be 1.13 (corresponding to a variation of ±17.4% with respect to average value), and the average pellet length was found to be 3.02 mm (corresponding to a variation of ±3.3% with respect to average value). The percent incorporation of pellets of irregular shape was found to be 1.0%; i.e., there were produced pellets which vary considerably in cross-section major axis length and contain a large amount of pellets of irregular shape.

Comparative Example 2

Discharge of strands was carried out in the same manner as in Example 2, except that the back pressure of the polymerization vessel was regulated so that the pressure loss upon transfer of pellets fell within a range of 23 to 27 KPa (corresponding to a variation of 16.0%).

In a manner similar to that of Example 2, sampling was carried out, and pellet length and the ratio of pellet cross-section major axis length to pellet length were determined, in a manner similar to that of Example 1. As a result, the average of the ratio (pellet cross-section major axis length/pellet length) was found to be 1.14 (corresponding to a variation of ±20.1% with respect to average value), and the average pellet length was found to be 3.02 mm (corresponding to a variation of ±3.3% with respect to average value). The percent incorporation of pellets of irregular shape was found to be 1.1%; i.e., there were produced pellets which vary considerably in cross-section major axis length and contain a large amount of pellets of irregular shape.

What is claimed is:

1. An apparatus for producing thermoplastic resin pellets, comprising:
    a batch-type polymerization vessel whose inner pressure can be controlled;
    a pelletizer for cutting a strand-form thermoplastic resin discharged from the polymerization vessel, thereby forming pellets;
    a pipe for transferring the pellets to a storage container by pneumatic transportation or suction transportation;
    a pressure differential measuring unit for determining variation in a pressure difference between the inlet and the outlet of the transfer pipe; and
    a pressure controlling unit for controlling the inner pressure of the batch-type polymerization vessel on the basis of the variation in the measured pressure difference;
    wherein the inner pressure of the batch-type polymerization vessel is controlled in relation to a pressure loss in the transfer pipe.

2. The apparatus for producing thermoplastic resin pellets according to claim 1, further comprising an apparatus for removing long, miscut strands, wherein the apparatus is provided between the outlet of the pelletizer and the transfer pipe.

* * * * *